United States Patent
Goodwin et al.

(10) Patent No.: US 7,343,391 B2
(45) Date of Patent: Mar. 11, 2008

(54) SYSTEM AND METHOD FOR INTERPROCESS SERVICES CLIENT ARTIFACT DOWNLOAD

(75) Inventors: Philip B. Goodwin, Cupertino, CA (US); Shun G. Chan, Sunnyvale, CA (US); Roberto R. Chinnici, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 700 days.

(21) Appl. No.: 10/382,774

(22) Filed: Mar. 5, 2003

(65) Prior Publication Data
US 2004/0177112 A1 Sep. 9, 2004

(51) Int. Cl.
*G06F 15/16* (2006.01)
(52) U.S. Cl. ........ 709/203; 709/219
(58) Field of Classification Search ....... 709/203, 709/217, 219, 203 OR; 715/700; 719/311, 719/328, 329, 330
See application file for complete search history.

(56) References Cited

U.S. PATENT DOCUMENTS

| | | | | |
|---|---|---|---|---|
| 5,897,638 A * | 4/1999 | Lasser et al. | ............... | 707/102 |
| 6,032,198 A * | 2/2000 | Fujii et al. | .................. | 719/328 |
| 6,061,515 A * | 5/2000 | Chang et al. | ............... | 717/114 |
| 6,308,225 B1 * | 10/2001 | Schofield | .................... | 719/316 |
| 6,336,118 B1 * | 1/2002 | Hammond | ............. | 707/103 Y |
| 2003/0204645 A1 * | 10/2003 | Sharma et al. | ............. | 709/219 |
| 2005/0120276 A1 * | 6/2005 | Kolawa et al. | ............... | 714/38 |

* cited by examiner

*Primary Examiner*—Saleh Najjar
*Assistant Examiner*—Benjamin R Bruckart
(74) *Attorney, Agent, or Firm*—Martine Penilla & Gencarella, LLP

(57) ABSTRACT

An invention is provided for affording an interprocess interface download in a computer environment. Client data is received from a user. In general, the client data includes information regarding the native computing environment of a client application. Based on the client data, a stub file is obtained that is capable of facilitating communication between the client application and a service application. The stub file is then provided to the user. In addition, one or more associated artifact files related to the stub file and the service application can be obtained and provided to the user along with the stub file.

16 Claims, 6 Drawing Sheets

SYSTEM AND METHOD FOR INTERPROCESS SERVICES CLIENT ARTIFACT DOWNLOAD

BACKGROUND OF THE INVENTION

1. Field of the Invention

This invention relates generally to computer networking, and more particularly to artifact downloads for interprocess services for use in client side applications.

2. Description of the Related Art

The art of networking computers has evolved over the years to bring computer users a rich communication and data sharing experience. To provide users with such a rich communication experience, standard communication protocols have been developed to improve interoperability between network applications. One such standard is the use of a stub and tie, or skeleton, for interprocess communication, particularly in distributed systems. This arrangement is often referred to as a Remote Procedure Call (RPC) mechanism.

In general, a distributed system is any system having multiple computers, which communicate over a network. Using the RPC paradigm, the processes that run on these computers each have an interface that is used by other processes on other machines to make requests. The interfaces are defined in an interface description language (IDL), where subroutine calls are defined in terms of the primitive data types, object references, and structures of these entities that are passed back and forth for the interface. These interfaces are then compiled, for any given implementation language, with the result being artifact files, such as stub and tie files. Once these are augmented with code provided by a human programmer, they can be compiled for the target operating system and processor.

The result is a stub/tie pair. The stub includes object code for the particular client processor and operating system that can accept a subroutine call from a client, translate the subroutine call into an interprocess protocol, and send the data bits across the physical connections of the network. The tie includes object code for the particular server processor and operating system that translates the bits received from the network into a data format that can be understood in the context of the receiver, makes a call to the server, and then translates any results into the interprocess protocol, which is sent back to the original client. Thereafter, the known bits received by the client stub are reformulated into a data format known by the client, and the call is finished.

For example, FIG. 1 is a diagram showing a conventional process for translating an IDL document into artifacts. As shown therein, the IDL document 100 delivers content to a compiler 110. As mentioned above, the IDL document 100 describes what a service application provides, in effect, acting as a manual. For example, based on this manual clients can determine how to use the services that are available from the application on a remote server. Based on the IDL document 100, the compiler 110 generates appropriate artifacts, which enable the use of the services described in the IDL document by a potential client. These artifacts can include, for example, stubs, skeletons, ties, data type definitions, exception definitions, and other data files that will be needed by the client application. For example, in FIG. 1, the compiler 110 generates a stub file 120 and a tie file 130.

FIG. 2 is a diagram representing a conventional RPC system for communication between a client and a server. A client application executing on a client system 210 makes a call using the stub 120. The stub 120 translates the call into an interprocess protocol and sends the data out across a communication channel 220, which can be, for example, the Internet, a message queue, an inter process communication (IPC) in an operating system, email, socket, pipe, etc.

There is a decoupling in languages between the client and the server, for example one could be written in Java and the other written in Pearl. Therefore, the communication between the client and the server should be facilitated with artifacts, such as the stub 120 and the tie 130. Together, the artifacts act as translators, translating for example from Java to Pearl and then back from Pearl to Java.

The data from the call that was initiated by the client is received at tie 130, which translates the data into a call on the service application. The service application executing on the service server 240 performs the operation requested. Thereafter, the results of the operation are sent as a return to the tie 130, which packages the return data based on the interprocess protocol and sends the packaged return across the communication channel 220 to the stub 120. The stub 120 then provides the return to the client application.

Currently client application programmers need to create their own stub files and other related artifact files based on an IDL, generally through the use of a compiler. Since, compilers such as compiler 110 typically have multiple settings and options, artifacts generated by client application programmers can be generated incorrectly if the correct settings and options are not properly utilized. The requirement that application developers acquire these tools and the expertise required to operate these tools increases the difficulty of accessing services from a remote server.

In view of the foregoing, there is a need for a more direct and simplified method of communication between a client and a remote server across a network.

SUMMARY OF THE INVENTION

Broadly speaking, embodiments of the present invention address these needs by providing interprocess interface downloads in a computer environment. Embodiments of the present invention allow users to create applications that utilize services from remote servers without needing to compile their own stub files. In one embodiment, a method is disclosed for providing an interprocess interface download in a computer environment. The method includes receiving client data from a user. In general, the client data includes information regarding the native computing environment of a client application and possibly details about the client application itself, such as its structure and the data types it uses. Based on the client data, a stub file is obtained that is capable of facilitating communication between the client application and a service application. The stub file is then provided to the user. In addition, one or more associated artifact files related to the stub file and the service application can be obtained and provided to the user along with the stub file.

A system for providing an interprocess interface in a computer environment is disclosed in an additional embodiment of the present invention. The system includes a user interface capable of prompting a user for client data. As above, the client data includes information regarding the native computing environment of a client application. The system also includes an artifact generator, which is in communication with the user interface. The artifact generator is capable of obtaining a stub file based on the client data. The stub file is capable of facilitating communication between the client application and a service application. In addition, the artifact generator is capable of providing the stub file to the user. In one aspect, the artifact generator can select a particular stub file from a plurality of pre-generated stub files based on the received client data. In a further aspect, the artifact generator can compile a particular IDL file to generate the stub file. The IDL file is selected based on the received client data. In addition, the artifact generator can select particular compiler options for compiling the IDL file based on the client data. Optionally, the artifact generator can be executed on a server that is separate from a server executing service applications. In this aspect, the client data can further include information indicating a particular service application from a plurality of service applications. In this manner, the stub file can be further obtained based on the particular service application indicated by the client data, thus allowing the artifact generator to service a plurality of service applications.

A computer program embodied on a computer readable medium for providing an interprocess interface download in a computer environment is disclosed in a further embodiment of the present invention. The computer program includes program instructions that receive client data from a user. As above, the client data includes information regarding a client application and its native computing environment. Program instructions are also included that obtain a stub file based on the client data that is capable of facilitating communication between the client application and a service application. The computer program further includes program instructions that provide the stub file to the user. Optionally, the computer program can includes program instructions that select a particular stub file from the plurality of pre-generated stub files based on the received client data, each pre-generated stub file being capable of operating in a particular native computing environment. Also optionally, the computer program can includes program instructions that compile a particular IDL file, which is selected based on the received client data. In this aspect, program instructions can be included that select particular compiler options for compiling the IDL file based on the client data. As above, the client data can further include information indicating a particular service application from a plurality of service applications. In this manner, the computer program can further obtain the stub file based on the particular service application indicated by the client data.

Embodiments of the present invention advantageously allow users to utilize services from remote server applications without requiring advanced knowledge of specific IDLs or advanced knowledge of IDL compilers. Moreover, since embodiments of the present invention prompt the user for information, the user does not need to know what information a specific artifact generator will need prior to interacting with the artifact generator. Furthermore, prompting the user for information allows embodiments of the present invention to present a plurality of options to the user that the user may not have known of prior to interacting with the artifact generator, such as optional services that are available. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for interprocess interface downloads in a computer environment. Embodiments of the present invention allow users to create applications that utilize services from remote servers without needing to compile their own stub files. In general, users can obtain any artifact files needed from the server providing the needed services, without needing to understand any IDL or needing to compile it into the specialized files for use in their environment. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
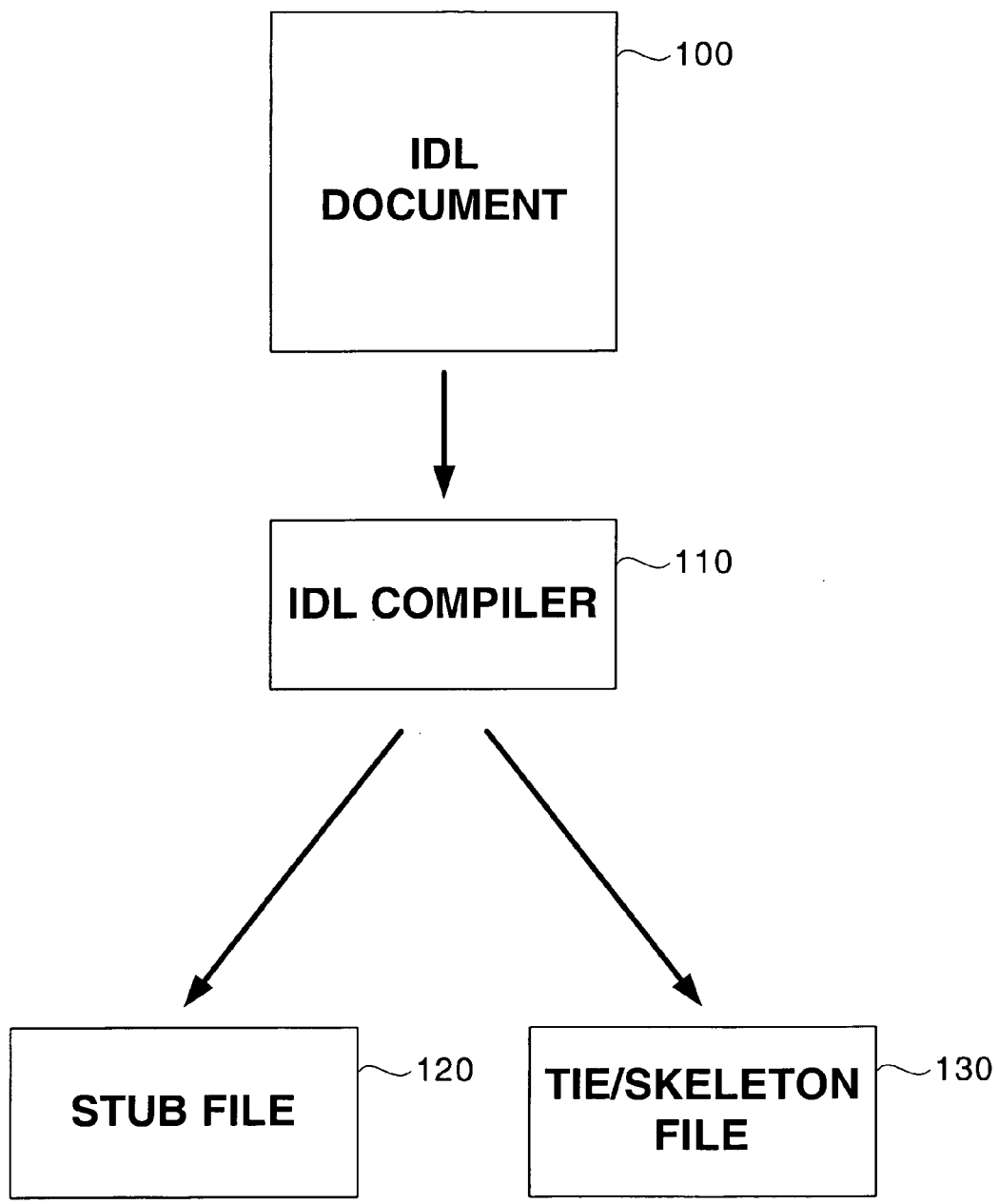
FIG. 1 is a diagram showing a conventional process for translating an IDL document into artifacts.
Figure 2:
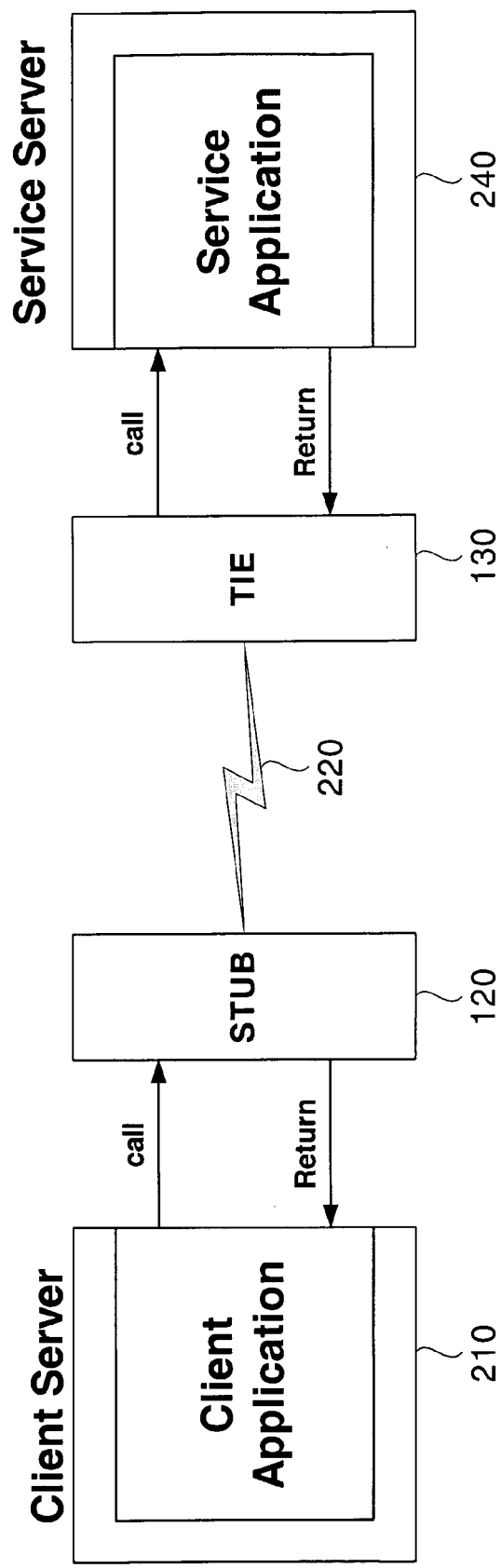
FIG. 2 is a diagram representing a conventional stub/tie based system for communication between a client and a server.
Figure 3:
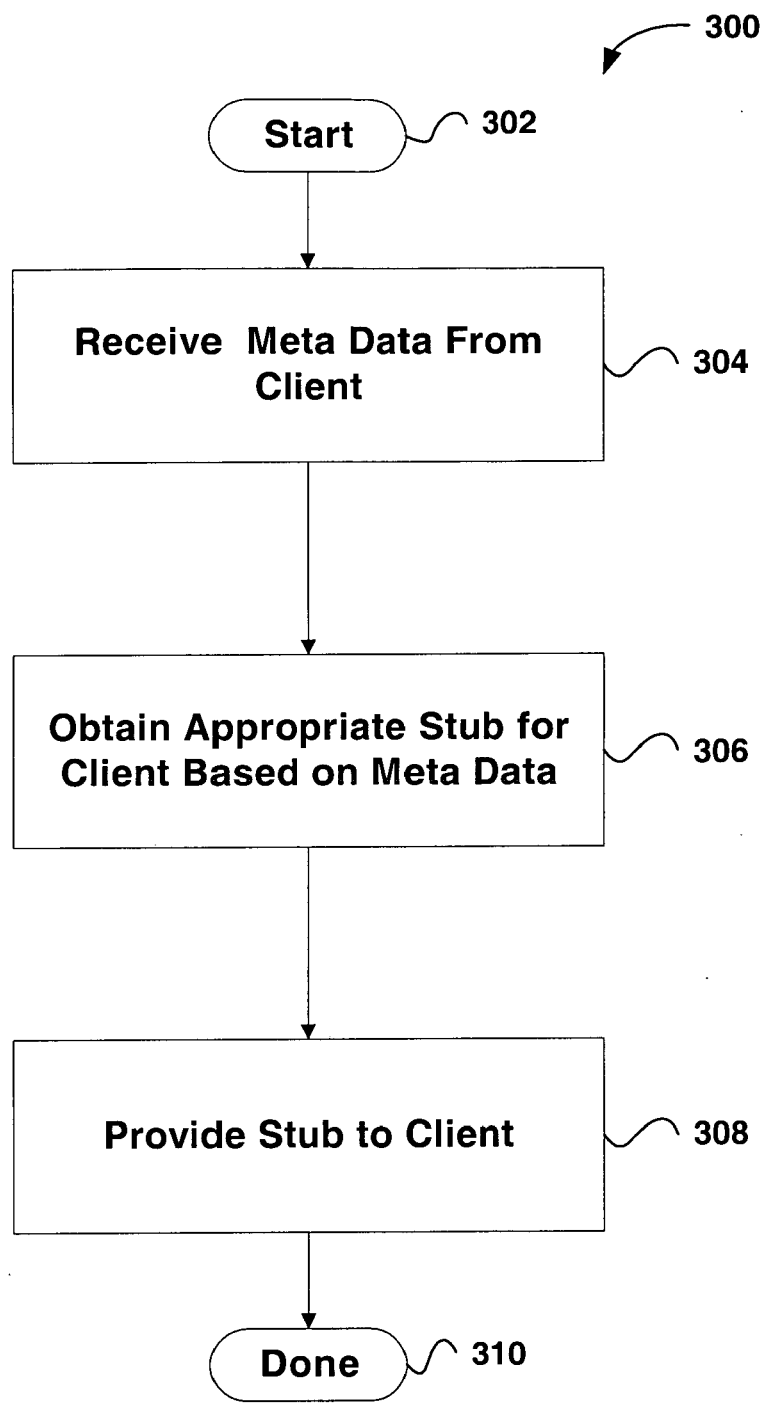
FIG. 3 is a flowchart showing a method for providing an interprocess interface download in a computer environment, in accordance with an embodiment of the present invention.

FIGS. 1 and 2 were described in terms of the prior art. FIG. 3 is a flowchart showing a method 300 for providing an interprocess interface download in a computer environment, in accordance with an embodiment of the present invention. In an initial operation 302, preprocess operations are performed. Preprocess operations can include, for example, determining which service application provides needed services, obtaining a connection with a server executing the service application, and other preprocess operations that will be apparent to those skilled in the art after a careful reading of the present disclosure.

In operation 304, meta data is received from the client. As mentioned above, embodiments of the present invention allow users to create applications that utilize services from other processes, such as remote servers, without needing to generate their own stub files. That is, users can obtain needed artifact files from the server providing the needed services, without needing to understand any IDL or needing to compile it into the specialized files for use in their environment.

In one embodiment, an artifact generator having a graphical user interface (GUI) is utilized to obtain meta data from the user. Meta data is the information utilized to generate an appropriate stub for the user. Hence, meta data can be, for example, the native language utilized to create the client application, information regarding the environment on which the client application will execute, information regarding the native compiler utilized to generate the client application, and other information that further facilitates creation of an appropriate stub for the user, as will be apparent to those skilled in the art after a careful reading of the present disclosure. Although the invention has been described in terms of a graphical user interface, it should be noted that the user interface (UI) does not need to be graphics based.

An appropriate stub for the client application is obtained based on the received meta data, in operation 306. Using the UI, the artifact generator of the embodiments of the present invention can prompt the user for specific information needed to generate an appropriate stub for the client application. In this manner, the user does not need to know what client based information is needed prior to interacting with the artifact generator, thus increasing the ease of use with which users interact with the artifact generator. For example, in one embodiment, the artifact generator can use the UI to prompt the user as to whether they desire a default stub or a customized stub. The default stub can be generated in the most common language, or be generated in a plurality of common languages for use in a plurality of well known computer environments. For more sophisticated users, a customized stub can be generated based on additional meta data provided by the user.

The actual stub and other artifact files can be pre-generated, generated at the time of the requests, or a combination of the above. For example, artifact files such as type definition files and exception type files can be pre-generated, while a stub file is generated for the specific user based on the meta data received in operation 304. In general, when obtaining pre-generated stub and other artifact files, embodiments of the present invention select the specific pre-generated files based on the meta data provided by the user. For example, a stub can be selected based on the native language used to create the client application and the computer environment executing the client application. Similarly, when generating artifact files, the meta data obtained from the user is utilized to select a specific IDL suitable for the user and provide compiler settings based on the needs and capabilities of the client application and environment.

In operation 308, the stub and other associated artifact files are provided to the client. Once the stub and other associated artifact files are obtained, either by selecting pre-generated files, compiling user specific artifact files, or both, the files are provided to the user. Post process operations are then performed in operation 308. Post process operations can include, for example, receiving additional user requests, updating pre-generated artifact files based on service application updates, and other post process operations that will be apparent to those skilled in the art after a careful reading of the present disclosure.

Embodiments of the present invention advantageously allow users to utilize services from remote server applications without requiring advanced knowledge of specific IDLs or advanced knowledge of IDL compilers. Moreover, since embodiments of the present invention prompt the user for information, the user does not need to know what information a specific artifact generator will need prior to interacting with the artifact generator. Furthermore, prompting the user for information allows embodiments of the present invention to present a plurality of options to the user that the user may not have known of prior to interacting with the artifact generator, such as optional services that are available.

Figure 4:
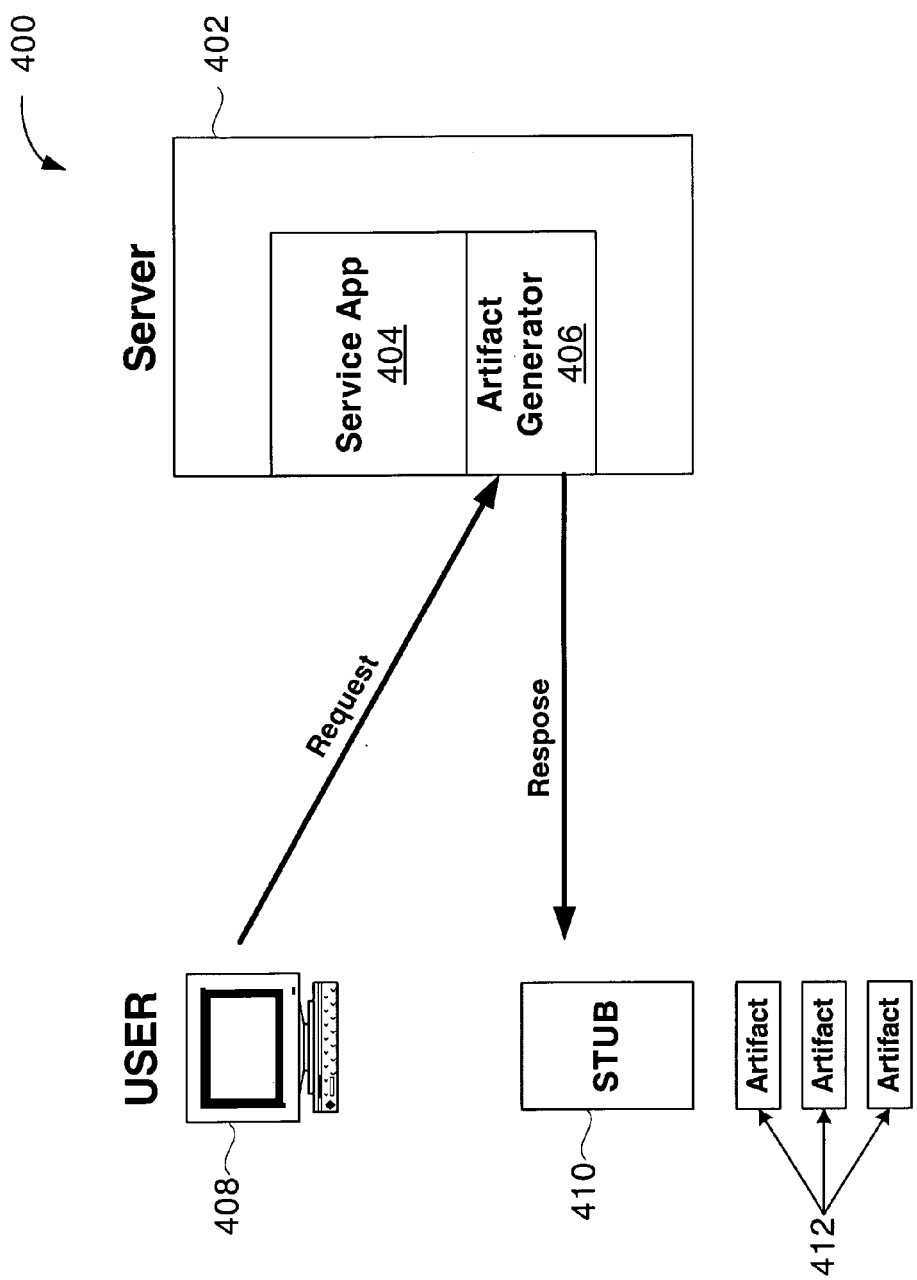
FIG. 4 is a block diagram showing an artifact generator based interprocess interface download system, in accordance with an embodiment of the present invention.

FIG. 4 is a block diagram showing an artifact generator based interprocess interface download system 400, in accordance with an embodiment of the present invention. As illustrated in FIG. 4, the interprocess interface download system 400 includes a server 402 executing a service application 404 and an artifact generator 406 associated with the service application 404. The service application 404 can be any application capable of providing services to client applications. As discussed above, the service application generally utilizes an RPC paradigm to facilitate communication with client applications.

Using the RPC paradigm, a client application executing on a client computer uses a stub as an interface to make requests for services provided by the service application 404, which itself includes a tie or skeleton that communicates with the stub. However, unlike conventional stub and tie based interprocess communication systems, embodiments of the present invention allow the user to utilize the services provided by the service application 404 without requiring advanced knowledge of the IDL used for interprocess communication with the service application 404.

More specifically, embodiments of the present invention provide an artifact generator 406, which is associated with one or more service applications 404. As mentioned above, each service application 404 has associated therewith a tie or skeleton, which facilitates interprocess communication between client applications and the service application 404. Client applications utilize a stub to communicate with the tie or skeleton of the service application 404. Conventionally, users had to obtain an associated IDL document and analyze the IDL document to determine how to utilize the services. In addition, the users had to compile the IDL document using specialized compiler settings based on their particular computer environment. This required advanced prior knowledge of interface description languages and how to utilize and compile IDL documents. Advantageously, embodiments of the present invention allow users to utilize the services of the service application 404 without requiring advanced prior knowledge of interface description languages and how to utilize and compile IDL documents.

In operation, a user 408 establishes communication with the artifact generator 406 associated with the desired service application 404. As mentioned above, one embodiment of the present invention utilizes a GUI as a front end for the artifact generator 406 to facilitate communication with the user 408. The GUI for the artifact generator 406 prompts the user for meta data, which is information utilized to generate an appropriate stub for the user. As described above, meta data can be, for example, the native language utilized to create the client application, information regarding the environment on which the client application will execute, information regarding the native compiler utilized to generate the client application, and other information that further facilitates creation of an appropriate stub for the user, as will be apparent to those skilled in the art after a careful reading of the present disclosure.

The artifact generator 406 then obtains an appropriate stub and other artifacts for the client application is based on the meta data received from the user 408. Using the GUI, the artifact generator 406 prompts the user 408 for specific information needed to generate an appropriate stub for the client application. Thus, the user 408 does not need to know what client based information is needed prior to interacting with the artifact generator 408, thus increasing the ease of use with which users interact with the artifact generator 406. For example, as described above, in one embodiment the artifact generator 406 utilizes the GUI to prompt the user as to whether they desire a default stub or a customized stub. The default stub can be generated in the most common language, or be generated in a plurality of common languages for use in a plurality of well known computer environments. For more sophisticated users, a customized stub can be generated based on additional meta data provided by the user.

Once the stub 410 and other associated artifact files 412 are obtained, either by selecting pre-generated files, compiling user specific artifact files, or both, the files are provided to the user 408. The stub 410 is defined in an IDL, where subroutine calls are defined in terms of the primitive data types, object references, and structures of these entities that are passed back and forth for the interface. The stub 410 provides object code for the particular processor and operating system that can accept a subroutine call from a client, translates the subroutine call into an interprocess protocol, and sends the data bits across the physical connections of the network. In one embodiment, Extensible Markup Language (XML) can be utilized as the interprocess protocol.

XML is an open standard for describing data and is often used for defining data elements on a Web page and business-to-business documents. XML uses a similar tag structure as HTML. However, whereas HTML defines how elements are displayed, XML defines what those elements contain. Further, HTML uses predefined tags, while XML allows tags to be defined by the developer of the page. Thus, virtually any data items, such as test suites and individual tests, can be identified, allowing XML documents to function like database records.

The human-readable XML tags provide a simple data format, which is defined in a DTD format that defines content type as well as name. Thus, unlike HTML, which uses a rather loose coding style and which is tolerant of coding errors, XML pages are "well formed," which means they comply with rigid rules.

An XML document primarily comprises a strictly nested hierarchy of elements with a single root. Elements can contain character data, child elements, or a mixture of both. In addition, they can have attributes. Child character data and child elements are strictly ordered, while attributes are not. The names of the elements and attributes and their order in the hierarchy (among other things) form the XML markup language used by the document, also known as the "validity" of the document. As mentioned above, this language can be defined by the document author or it can be inferred from the document's structure.

Once the tie receives data bits from the stub, the tie of the service application 404 translates the known bits into a data format that can be understood in the context of the receiver, makes a call to the server application 404, and then translates any results into the interprocess protocol, which is sent back to the original stub 410 for the client application. Thereafter, the known bits received by the client stub 410 are reformulated into a data format known by the client application, and the call is finished.

As mentioned previously, the stub 410 and other artifact files 412 can be pre-generated, generated at the time of the requests, or a combination of the above. For example, artifact files such as type definition files and exception type files can be pre-generated, while a stub file 410 is generated for the specific user based on the meta data received. In general, when obtaining pre-generated stub 410 and other artifact files 412, embodiments of the present invention select the specific pre-generated files based on the meta data provided by the user. For example, a stub 410 can be selected based on the native language used to create the client application and the computer environment executing the client application. Similarly, when generating artifact files 412, the meta data obtained from the user 408 is utilized to select a specific IDL suitable for the user 408 and to provide compiler settings based on the needs and capabilities of the client application and environment.

Figure 5B:
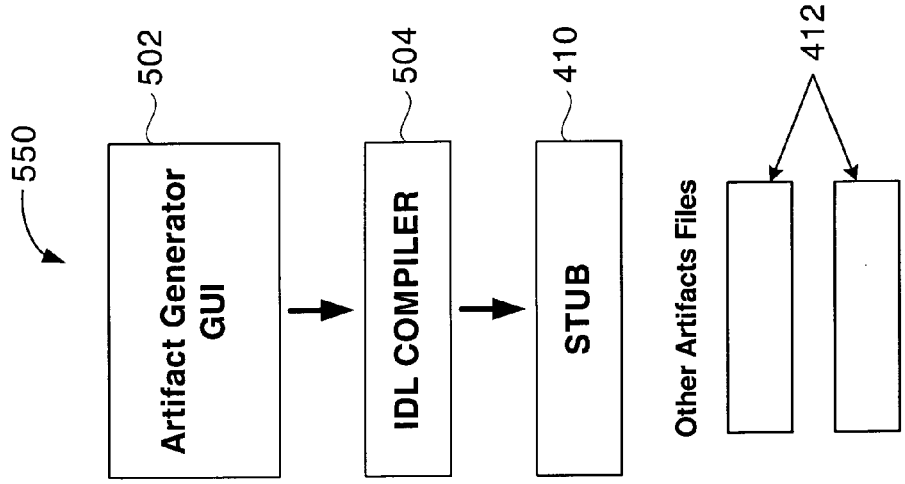
FIG. 5B illustrates a method for generating a custom stub and associated artifact files for use in client applications, in accordance with an embodiment of the present invention.
Figure 5A:
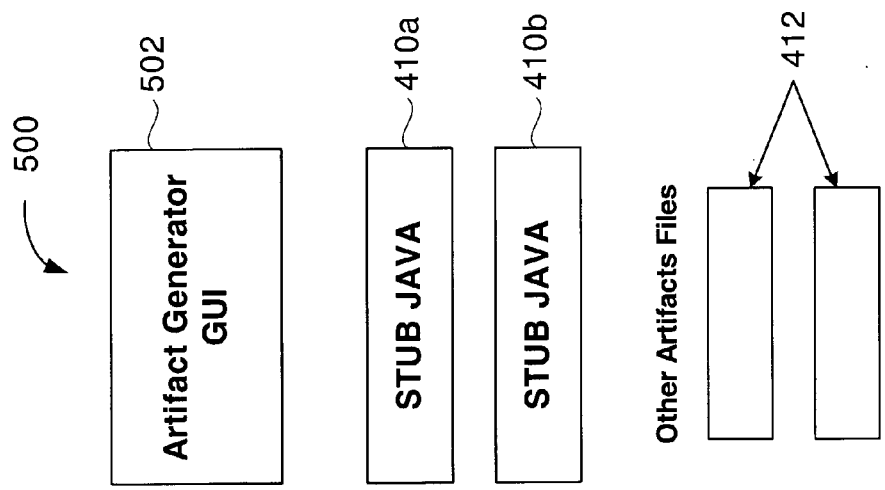
FIG. 5A illustrates a method for selecting pre-generated stub and artifact files for use in client applications, in accordance with an embodiment of the present invention.

FIGS. 5A and 5B are block diagrams illustrating two methods for obtaining stub and other artifact files using an artifact generator. In particular, FIG. 5A illustrates a method for selecting pre-generated stub and artifact files for use in client applications, in accordance with an embodiment of the present invention. As shown in FIG. 5A, the artifact generator generates a plurality of stubs 410a-410b based on a plurality of anticipated requests that will be received. For example, stubs can be generated from a plurality of native client languages, such as JAVA and C++. Also, stubs can be generated based on anticipated client computer environments, and subsets of desired services. In addition, a plurality of other artifact files 412 can be generated, each corresponding to one or more of the pre-generated stub files 410a-410b.

In operation, the artifact generator GUI 502 receives a request from a user for a stub to facilitate usage of services provided from a particular service application. The artifact generator GUI 502 then prompts the user for specific meta data to determine which stub file 410a-410b best matches the user's requirements. Based on the meta data received from the user, the artifact generator selects the stub file 410a-410b that best matches the needs of the user. In addition, the artifact generator selects particular additional artifact files 412 that are associated with the selected stub file based on the received meta data. The selected stub file 410a-410b and associated artifact files 412 are then provided to the user. For example, the selected stub file 410a-410b and associated artifact files 412 can be transmitted to the user via a network, such as the Internet.

FIG. 5B illustrates a method for generating a custom stub and associated artifact files for use in client applications, in accordance with an embodiment of the present invention. In the embodiment of FIG. 5B, the artifact generator utilizes an IDL compiler 504 to generate custom stubs for client applications based on received user meta data. In this manner advanced users can utilize the artifact generator to create stub 410 and other artifact files 412 that more closely fit the client applications they develop without needing to actually compile the IDL documents themselves. Thus, a user can obtain customized stub and other artifact files without requiring advanced IDL knowledge or advanced IDL compiler knowledge. Furthermore, because the artifact generator has advanced knowledge of the services provided by the service application and advanced knowledge of the tie file utilized by the service application, the generated custom stub 410 and other artifact files 412 can be more tightly coupled with the tie and related service application, thus increasing communication efficiency.

As stated previously, embodiments of the present invention advantageously allow users to utilize services from remote server applications without requiring advanced knowledge of specific IDLs or advanced knowledge of IDL compilers. Moreover, since embodiments of the present invention prompt the user for information, the user does not need to know what information a specific artifact generator will need prior to interacting with the artifact generator. Furthermore, prompting the user for information allows embodiments of the present invention to present a plurality of options to the user that the user may not have known of prior to interacting with the artifact generator, such as optional services that are available.

In one embodiment, an artifact generator can be created using the Java programming language. Java, originally developed by Sun Microsystems, is an object-oriented, multi-threaded, portable, platform-independent, secure programming environment used to develop, test and maintain software programs. Java programs have found extensive use on the World Wide Web, which is the Internet's multimedia information retrieval system. These programs include full-featured interactive, standalone applications, as well as smaller programs, known as applets, that run in a Java-enabled Web browser or applet viewer.

In addition to the Java programming language, other programming languages may be used to implement the embodiments of the present invention, such as other object oriented programming languages. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software application can be written using an object-oriented programming language whereby the program's functionality is implemented using objects. Examples of object-oriented programming languages include C++ as well as Java.

Figure 6:
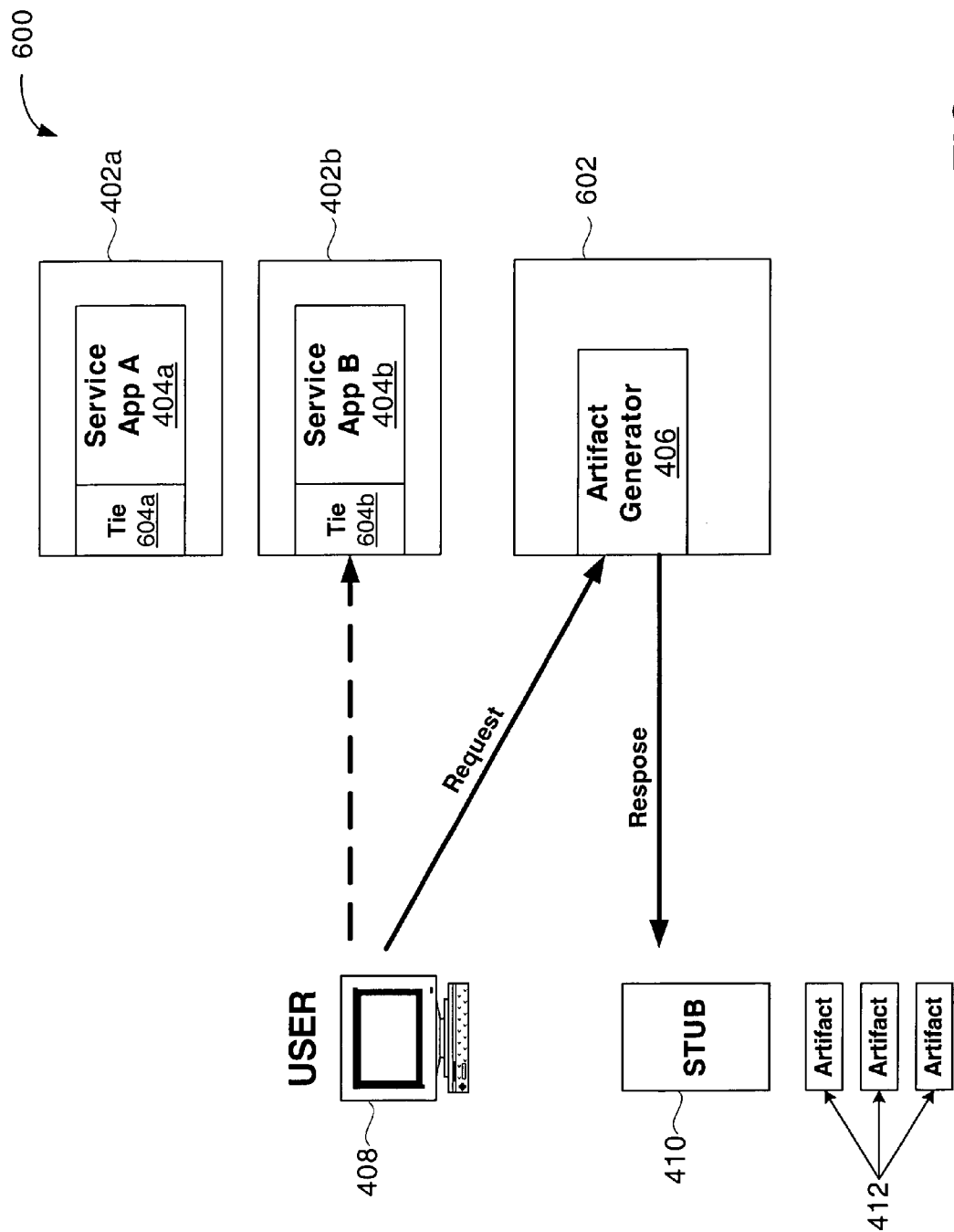
FIG. 6 is a block diagram showing a remote artifact generator based interprocess interface download system 600, in accordance with an embodiment of the present invention.

In addition to providing the artifact generator on the same server as the actual service application, the artifact generator can be located on a separate server, such as a server operated by a third party provider. FIG. 6 is a block diagram showing a remote artifact generator based interprocess interface download system 600, in accordance with an embodiment of the present invention. As illustrated in FIG. 6, the interprocess interface download system 600 includes a server 602 executing an artifact generator 406. Additional servers 402a-402b are also included, each executing a service application 404a-404b. The service applications 404a-404b can be any applications capable of providing services to client applications. As discussed above, each service application 404a-404b utilizes a tie 604a-604b to facilitate communication with client applications.

As discussed above, embodiments of the present invention allow the user to utilize the services provided by the service applications 404a-404b without requiring advanced knowledge of the IDL used for interprocess communication with the service application 404. In the embodiment of FIG. 6, the artifact generator 406 is associated with a plurality of service applications 404a-404b. As mentioned above, each service application 404 has associated therewith a tie 604a-604b or skeleton, which facilitates interprocess communication between client applications and the service application 404a-404b. Client applications utilize a stub to communicate with the tie 604a-604b or skeleton of the service application 404a-404b. Conventionally, users had to obtain an associated IDL document and analyze the IDL document to determine which services were available and how to utilize theses services. In addition, the users had to compile the IDL document using specialized compiler settings based on their particular computer environment. This required advanced prior knowledge of interface description languages and how to utilize and compile IDL documents. Advantageously, embodiments of the present invention allow users to utilize the services of the service applications 404a-404b without requiring advanced prior knowledge of interface description languages and how to utilize and compile IDL documents.

In operation, a user 408 establishes communication with the artifact generator 406, which is associated with the service applications 404a-404b. As mentioned above, one embodiment of the present invention utilizes a GUI as a front end for the artifact generator 406 to facilitate communication with the user 408. The GUI for the artifact generator 406 prompts the user for meta data, which is information utilized to generate an appropriate stub for the user. As described above, meta data can be, for example, the native language utilized to create the client application, information regarding the environment on which the client application will execute, information regarding the native compiler utilized to generate the client application, and other information that further facilitates creation of an appropriate stub for the user, as will be apparent to those skilled in the art after a careful reading of the present disclosure. In the example of FIG. 6, the meta data further includes which service application 404a-404b the user 408 will use. For example, the user 408 can inform the artifact generator 406 that artifact files are needed for the service application B 404b executing on server 402b. In this manner, the artifact generator 406 can provide stubs and related artifact files for a plurality of service applications executing on different servers. In one embodiment, the GUI of the artifact generator 406 can prompt the user for the type of service desired by the user 408. In response to the user's answer, a list of service applications capable of providing the desired services can be presented to the user 408. The user can then select the desired service application.

The artifact generator 406 then obtains an appropriate stub for the client application is based on the meta data received from the user 408. Using the GUI, the artifact generator 406 prompts the user 408 for specific information needed to generate an appropriate stub for the client application. Thus, the user 408 does not need to know what client based information is needed prior to interacting with the artifact generator 406, thus increasing the ease of use with which users interact with the artifact generator 406.

Once the stub 410 and other associated artifact files 412 are obtained, either by selecting pre-generated files, compiling user specific artifact files, or both, the files are provided to the user 408. The stub 410 is defined in an IDL, where subroutine calls are defined in terms of the primitive data types, object references, and structures of these entities that are passed back and forth for the interface. The stub 410 provides object code for the particular processor and operating system that can accept a subroutine call from a client, translates the subroutine call into an interprocess protocol, and sends the data bits across the physical connections of the network.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for obtaining specific artifact files for download over a computer network, the artifact files enabling interprocess communication, comprising the operations of:

requesting access to artifact files to enable use of a service provided by a service application, the artifact files to be integrated with a client application to allow access to the service, the service application being associated with an artifact generator, and the artifact generator being capable of executing an interface description language (IDL) process, the association of the service application with the artifact generator provides the artifact generator with information on how to interface with the IDL process;

prompting a user, through a graphical user interface at a front end of an artifact generator, for client data including information regarding the client application that is to use the service application and a native computing environment of the client application;

generating artifact files based on the client data and service application, the artifact files include a stub file based on execution driven by the artifact generator, the artifact generator being configured to trigger execution of the IDL process without user knowledge-input for running the IDL process, so that the generate artifact files operate with the client application;

integrating the artifact files with the client application, the artifact files provided by the artifact generator and integrated with the client application ensuring that the client application is capable of utilizing the services provided by the service application when the client application requests the services over the computer network from the service application; and executing the artifact generator to pre-generate a plurality of additional stub files, each stub file being generated to operate in a particular native computing environment.

2. A method as recited in claim 1, wherein the artifact files are related to the service application.

3. A method as recited in claim 1, wherein a particular stub file for selected native computing environments is obtained by selecting the particular stub file from the plurality of pre-generated stub files.

4. A computer implemented method for obtaining specific artifact files for download over a computer network, the artifact files enabling interprocess communication, comprising the operations of:

requesting access to artifact files to enable use of a service provided by a service application, the artifact files to be integrated with a client application to allow access to the service, the service application being associated with an artifact generator, and the artifact generator being capable of executing an interface description language (IDL) process, the association of the service application with the artifact generator provides the artifact generator with information on how to interface with the IDL process:

prompting a user, through a graphical user interface at a front end of an artifact generator, for client data including information regarding the client application that is to use the service application and a native computing environment of the client application;

generating artifact files based on the client data and service application, the artifact files include a stub file based on execution driven by the artifact generator, the artifact generator being configured to trigger execution of the IDL process without user knowledge-input for running the IDL process, so that the generate artifact files operate with the client application;

integrating the artifact files with the client application, the artifact files provided by the artifact generator and integrated with the client application ensuring that the client application is capable of utilizing the services provided by the service application when the client application requests the services over the computer network from the service application; and selecting particular compiler options through the user interface for compiling an IDL file when executing the IDL process.

5. A method as recited in claim 1, wherein the client data further includes information indicating a particular service application from a plurality of service applications.

6. A method as recited in claim 4, wherein the artifact files are related to the service application.

7. A method as recited in claim 4, wherein a particular stub file for selected native computing environments is obtained by selecting the particular stub file from the plurality of pre-generated stub files.

8. A method as recited in claim 4, wherein the client data further includes information indicating a particular service application from a plurality of service applications.

9. A computer system for generating specific artifact files enabling interprocess communication over a computer network, comprising:

a server containing a service application;

a client containing a client application that is to use the service application; and a graphical user interface capable of prompting a user for client data at a front end of an artifact generator, the client data including information regarding the client application and a native computing environment of the client application, and the artifact generator being associated to the service application, the artifact generator providing the user interface, the artifact generator configured to generate artifact files that include a stub file based on the client data and the service application that is associated with the artifact generator, wherein the artifact generator, when generating the artifact files is configured to trigger execution of an interface description language (IDL) process without user input directly to the IDL process, such that the generated artifact files are capable of enabling communication between the client application and a service application when the stub file is integrated with the client application, the artifact generator configured to obtain one or more associated artifact files related to the stub file and the server application, the obtained associated artifact files being provided to the user along with the stub file.

10. A system as recited in claim 9, wherein the artifact generator is capable of compiling a particular interface description language (IDL) file to generate a particular stub file, the IDL file being selected based on the received client data, the artifact generator selecting particular compiler options for compiling the IDL file based on the client data.

11. A system as recited in claim 9, wherein the artifact generator is executed on a server that is separate from the server executing service applications, and wherein the client data further includes information indicating a particular service application from a plurality of service applications.

12. A system as recited in claim 11, wherein the stub file is further obtained based on the particular service application indicated by the client data.

13. A computer system for generating specific artifact files enabling interprocess communication over a computer network, comprising:

a server containing a service application;

a client containing a client application that is to use the service application; and a graphical user interface capable of prompting a user for client data at a front end of an artifact generator, the client data including information regarding the client application and a native computing environment of the client application, and the artifact generator being associated to the service application, the artifact generator providing the user interface, the artifact generator configured to generate artifact files that include a stub file based on the client data and the service application that is associated with the artifact generator, wherein the artifact generator, when generating the artifact files is configured to trigger execution of an interface description language (IDL) process without user input directly to the IDL process. such that the generated artifact files are capable of enabling communication between the client application and a service application when the stub file is integrated with the client application, the artifact generator configured to enable selection of a particular stub file from a plurality of pre-generated stub files based on the received client data.

14. A system as recited in claim 13, wherein the artifact generator is capable of compiling a particular interface description language (IDL) file to generate a particular stub file, the IDL file being selected based on the received client data, the artifact generator selecting particular compiler options for compiling the IDL file based on the client data.

15. A system as recited in claim 13, wherein the artifact generator is executed on a server that is separate from the server executing service applications, and wherein the client data further includes information indicating a particular service application from a plurality of service applications.

16. A system as recited in claim 15, wherein the stub file is further obtained based on the particular service application indicated by the client data.

* * * * *